United States Patent

Greuter et al.

[15] 3,684,900

[45] Aug. 15, 1972

[54] BISTABLE MULTIVIBRATOR INCLUDING SPECIAL CHARGING CIRCUIT FOR CAPACITIVE LINKS FOR IMPROVED POWER TO SWITCHING SPEED RATIOS

[72] Inventors: Andre Greuter; Arpad Korom, both of Zurich, Switzerland

[73] Assignee: Gesellschaft zur Forderung der Forschung an der Eidgenossischen Technischen Hochschule, Zurich, Switzerland

[22] Filed: June 2, 1970

[21] Appl. No.: 42,821

[30] Foreign Application Priority Data

June 6, 1969 Switzerland ............... 8633/69

[52] U.S. Cl. .................. 307/292, 307/271, 307/297, 307/246, 307/225

[51] Int. Cl. ........................................... H03k 3/286

[58] Field of Search ...... 307/247, 291, 292, 246, 271, 307/297, 225

[56] References Cited

UNITED STATES PATENTS

| | | | |
|---|---|---|---|
| 2,885,574 | 5/1959 | Roesch | 307/291 |
| 3,317,750 | 5/1967 | Narud et al. | 307/291 |
| 3,473,045 | 10/1969 | Niemann | 307/291 X |

FOREIGN PATENTS OR APPLICATIONS

| | | | |
|---|---|---|---|
| 1,955,942 | 5/1970 | Germany | 307/292 |

*Primary Examiner*—John S. Heyman
*Attorney*—Woodhams, Blanchard and Flynn

[57] ABSTRACT

An electronic circuit arrangement having at least one bistable multivibrator, particularly improved for use in integrated switching circuits at reduced power input for the same switching frequency or at an increased switching frequency for the same power input. The multivibrator has two switch stages, each having a switching transistor and a control transistor of the same polarity with parallel collector-emitter paths and bases connected through capacitive links to the stepping input of the multivibrator. A preliminary transistor of the same polarity has its collector-emitter section connected between the base and collector of the control transistor of a given switch stage for charging the capacitive links with a constant current during multivibrator switching. In modified embodiments, two sets of further transistors provide constant current to the preliminary transistor base and to the collectors of the switching and control transistors respectively, of the several stages. In one such embodiment, separate reference voltage sources provide base current to the two sets. In another, the same source is used for both sets. In still another, the same source is used for both sets, but indirectly as to one set. In a further modification, a plurality of multivibrators are connected in a counter chain, the reference voltage sources of which are energized by a further circuit having a plurality of constant current sources.

15 Claims, 10 Drawing Figures

INVENTORS
ANDRÉ GREUTER
ARPAD KOROM
BY
Woodhams, Blanchard & Flynn
ATTORNEYS

INVENTORS
ANDRE GREUTER
ARPAD KOROM
BY Woodhams, Blanchard & Flynn
ATTORNEYS

INVENTORS
ANDRÉ GREUTER
ARPAD KOROM
BY
Woodhams, Blanchard & Flynn
ATTORNEYS

INVENTORS
ANDRÉ GREUTER
ARPAD KOROM
BY
Woodhams, Blanchard & Flynn
ATTORNEYS

INVENTORS
ANDRÉ GREUTER
ARPAD KOROM
BY
Woodhams, Blanchard & Flynn
ATTORNEYS

INVENTORS
ANDRE GREUTER
ARPAD KOROM
BY
Woodhams, Blanchard & Flynn
ATTORNEYS

BISTABLE MULTIVIBRATOR INCLUDING SPECIAL CHARGING CIRCUIT FOR CAPACITIVE LINKS FOR IMPROVED POWER TO SWITCHING SPEED RATIOS

FIELD OF THE INVENTION

The invention relates to an electronic circuit arrangement, more especially for integrated switching circuits, having at least one bistable multivibrator which comprises two switch steps, i.e., stages, each with one switching valve or transistor and one control valve or transistor of the same polarity or type, having the collector-emitter paths in each switch stage connected in parallel, and in which the base of the control transistor of each of the two switch stages is connected through a capacitive link to a common stepping input of the multivibrator, and the base of the switching transistor of each switch stage is coupled directly to the collectors of the switching and control transistors of the other switch stage, and in which the collectors of the switching and control transistors of one of the two switch stages are connected to a signal output of the multivibrator.

BACKGROUND OF THE INVENTION

Bistable multivibrators of the above mentioned type are already known, e.g., from the textbook "-Micropower Electronics" by E. Keonjian, Oxford 1964, page 64, FIG. 5. In these known bistable multivibrators as seen for example from the oscillograms of a counter network of such multivibrators in FIG. 7 on page 66 of the aforementioned technical work, the upper limit of the repetition frequency is lowered as the power supplied to the multivibrator is reduced. In the aforementioned oscillograms, the smoother the corners of the square wave pulses for a given counter stage, the smaller the power supplied.

This decrease of the upper frequency limit with a decline in the power supplied has various causes. One results from real transistor interelectrode and interconnection capacitances and apparent transistor capacitances in the multivibrator circuit, which must be charged during multivibrator switching, the charging time increasing with a decrease in current (power) input to the multivibrator.

The upper frequency limits thus caused are, however, far above the upper limits achievable presently with corresponding values of the supplied current.

Thus, the determining causes of the upper frequency limit decrease with decline of the supplied power or current are of a different nature.

One determining cause not present in a single multivibrator of the type mentioned, but only in a counter chain comprising a plurality of interconnected multivibrators of such type, is the reaction produced by the capacitive coupling of the single counter stages to each other, or by the capacitive links provided for this purpose, on the multivibrator acting as an impulse sender for the next counter stage. Thus, not only the internal capacity of the impulse sender multivibrator, but in addition the aforementioned coupling capacity, must be charged from the current supplied. The charging time for this collective capacity therefore increases with coupling capacity increases and the upper frequency limit decreases accordingly.

Hitherto these coupling capacities have been selected large compared to the aforesaid internal capacity. This alone has considerably decreased the upper frequency limit in multivibrators of the aforesaid type connected in counter networks.

This selection of values has, however, been necessary to transfer the required switching power over the coupling capacities to reliably switch the next counter stage.

The latter requires the control input of the next stage to be held at a high voltage long enough to allow the required discharge of internal capacitances in such next counter stage, i.e., in the one of the switch stages thereof to be switched conductive. However, during such switching a comparatively great loss current flows over the ohmic resistance connecting the base and collector of the control transistor of such switch stage. The switching power which must be transferred is therefore relatively great.

In another, not hitherto known, version of multivibrators of the type mentioned, the aforementioned ohmic resistances are replaced by diodes. These diodes are nonconductive during switching and therefore pass little loss current compared to the aforementioned ohmic resistances. Consequently, the switching power to be transferred by the coupling capacities — if the diode capacities could be disregarded — would be substantially lower, and accordingly the coupling capacities could be substantially smaller, and therefore reduce the upper frequency limit value very little.

If, however, the diode capacitances are small enough to be disregarded, the diode acts, in effect, as a high resistance in the charging path of the coupling capacitance thereby slowing charging of the coupling capacitance and increasing multivibrator switching time. The same effect occurs, though perhaps to a lesser extent where the aforementioned ohmic resistors are not replaced by diodes. Thus, in either case, where power input to the multivibrator is low, the upper switching frequency limit will therefore likewise be low.

There now exists, especially in subminiature technology, a demand on the one hand for reduction of circuit power consumption to the uttermost minimum realizable. However, simultaneously on the other hand, the demand has increased for the operation frequency or the upper limit frequency of these circuits to be as high as possible, and to be reduced as little as possible by a decrease of the power consumption.

Since these two demands, as mentioned, conflict in the case of the multivibrator of the type mentioned, it has not been possible to date, for a given operation frequency, to reduce its power consumption below a certain limit value which is dependent upon the operation frequency.

An object of the invention is thus to provide an electronic circuit arrangement of the type mentioned at the beginning, more especially for integrated switching circuits, in which this lower limit value of the power consumption can be reduced considerably below the power consumption value hitherto regarded as the lowest for the same operation frequency, or in which, with a rigidly pre-determined power consumption, the upper limit of the repetition frequency of the multivibrator or multivibrators can be considerably raised.

SUMMARY OF THE INVENTION

The objects and purposes of the invention are met, in the case of an electronic circuit arrangement of the type mentioned at the beginning by providing each of the two switch stages of the multivibrator with a preliminary valve or transistor supplied with at least approximately constant base current. The collector-emitter section of such preliminary transistor is connected between the base and collector of the control transistor of the same switch stage, and its polarity is the same as that of the control transistor in the same switch stage.

Thus, the aforementioned charging up of the coupling capacities, or the capacitive links forming them, takes place with a substantially constant charging current delivered by the preliminary transistors, instead of an exponentially reducing charging current supplied via resistances or diodes, whereby the time necessary for the charging up can be quite considerably shortened, and therefore the upper limit of the repetition frequency of the multivibrator or multivibrators raised, or in the case of a rigidly predetermined operation frequency, the power consumption of the connection arrangement can be considerably reduced.

In the present circuit, the collector and emitter of the preliminary transistor are preferably connected to the collector and base, respectively, of the control transistor of the relevant switch stage, in each switch stage of the multivibrator or multivibrators, the polarity of each preliminary transistor being the same as that of the control transistor in the same switch stage. This connection is more advantageous than having the preliminary transistor-emitter at the collector, and the preliminary transistor-collector at the base of the corresponding control transistor.

Diodes can be provided as capacitive links between the common stepping input of the multivibrator and the base electrodes of the control transistors of the two switch stages of the multivibrator. This is especially advantageous for integrated switching circuits in that the necessary capacities are formed by semi-conductor elements included in the integrated switching circuits and producible in the same manufacturing process as the transistors.

In one embodiment, the base of the preliminary transistor of each switch stage is connected to a constant current source. The source contains a further transistor of polarity opposite that of the preliminary transistor, to keep the current constant. A reference voltage at the base-emitter section of the further transistor keeps the current in its collector-emitter circuit at least approximately constant. The collector of the further transistor connects to the base of the preliminary transistor. Furthermore, the connected collectors of the switching and control transistors of each switch stage connect to a constant current source comprising a still further transistor of polarity opposite that of the switching and control transistors, at whose base-emitter section is situated a reference voltage which keeps the current in its collector-emitter circuit at least approximately constant, and to whose collector the collectors of the switching and control transistors are connected. In such circuit only one or two ohmic resistances are necessary. In integrated circuits this is a great advantage, because ohmic resistances require substantial space. The one or two ohmic resistances still necessary can be arranged as discreet resistances between the current supply source and the integrated circuits.

Advantageously, the constant current sources for the base currents of the preliminary transistors deliver a smaller current than the constant current sources to which the collectors of the connection and control transistors are connected.

For this purpose the base-emitter sections said further transistors can be connected in parallel, and the base-emitter sections of said still further transistors can be connected in parallel. Each of these two groups of base-emitter sections can be connected to a separate reference voltage source. Alternately, both groups can be connected to a common reference voltage source, the base-emitter sections of the still further transistors being connected directly to the common reference voltage source, and the base-emitter sections of the further transistors being connected via a common emitter resistance to the common reference voltage source.

A resistance dependent upon temperature, and charged with an at least approximately constant reference current can be provided as a reference voltage source, preferably being a transistor of the same polarity as the transistors forming the constant current elements, the emitter and connected base and collector electrodes of which form the poles of the resistance dependent upon temperature.

Alternately, the base-emitter sections of the further and still further transistors of the same switch stage can be connected in series. The series connections of the base-emitter sections of the various switch stages are then connected to a common reference voltage source. A resistance dependent upon temperature and provided at least approximately constant reference current is used as the common reference voltage source. The resistance is formed from two transistors of the same polarity as the transistors which keep the current constant. The base-emitter sections of said two transistors are connected in series, the emitter and base electrodes at the ends of this series connection forming the two poles of the resistance dependent upon temperature. The collector electrode of the transistor whose base electrode forms one such pole, is preferably likewise connected to such pole. Such circuit has the advantage that firstly, the base currents of the preliminary transistors are necessarily low in proportion to the collector and base currents of the switching and control transistors, and only a single ohmic resistance is necessary.

If the electronic circuit arrangement forms a counter chain, or contains a plurality of bistable multivibrators connected together to form an impulse frequency reducer or a counter chain, advantageously at least one group of the bistable multivibrators forming the impulse frequency reducer or the counter chain can be provided with preliminary transistors in their individual switch stages, such one group of bistable multivibrators being arranged in uninterrupted succession from the input of the impulse frequency reducer or counter chain to a definite reducer stage or counter stage, because the operation frequency of a counter chain is at its highest in the first stages, and declines from stage to stage by the factor 2.

BRIEF DESCRIPTION OF THE DRAWINGS

The invention is explained more fully subsequently in several exemplified embodiments, by reference to the following figures.

DETAILED DESCRIPTION

EMBODIMENT OF FIG. 2

Figure 1:
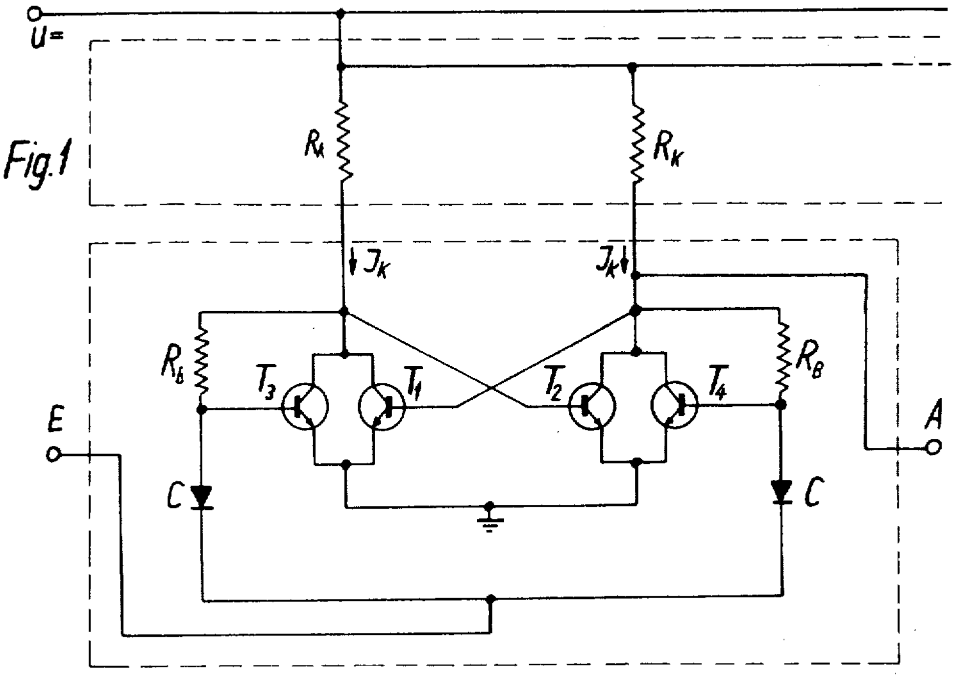
FIG. 1 shows the circuit of the known multivibrator mentioned at the beginning.

In the known bistable multivibrator circuit shown in FIG. 1, and mentioned at the beginning, each of the two switch steps, i.e., stages, embraces a connection, i.e., switching, transistor $T_1$ or $T_2$, a control transistor $T_3$ or $T_4$, a collector resistance $R_K$, via which the collector currents of the transistors $T_1$ and $T_3$, also the base currents of the transistors $T_2$ and $T_3$ or the collector currents of the transistors $T_2$ and $T_4$, and also the base currents of the transistors $T_1$ and $T_4$ are conducted, a base resistance $R_B$, via which the base current of the control transistor $T_3$ or $T_4$ is conducted, and a diode C, acting as a capacity, for the direct coupling of the base of the control transistor $T_3$ or $T_4$ to the stepping input E. Furthermore, the signal output A of the bistable multivibrator is connected to the collector of one of the two switching transistors $T_1$ and $T_2$, here to the collector of switching transistor $T_2$.

Figure 2:
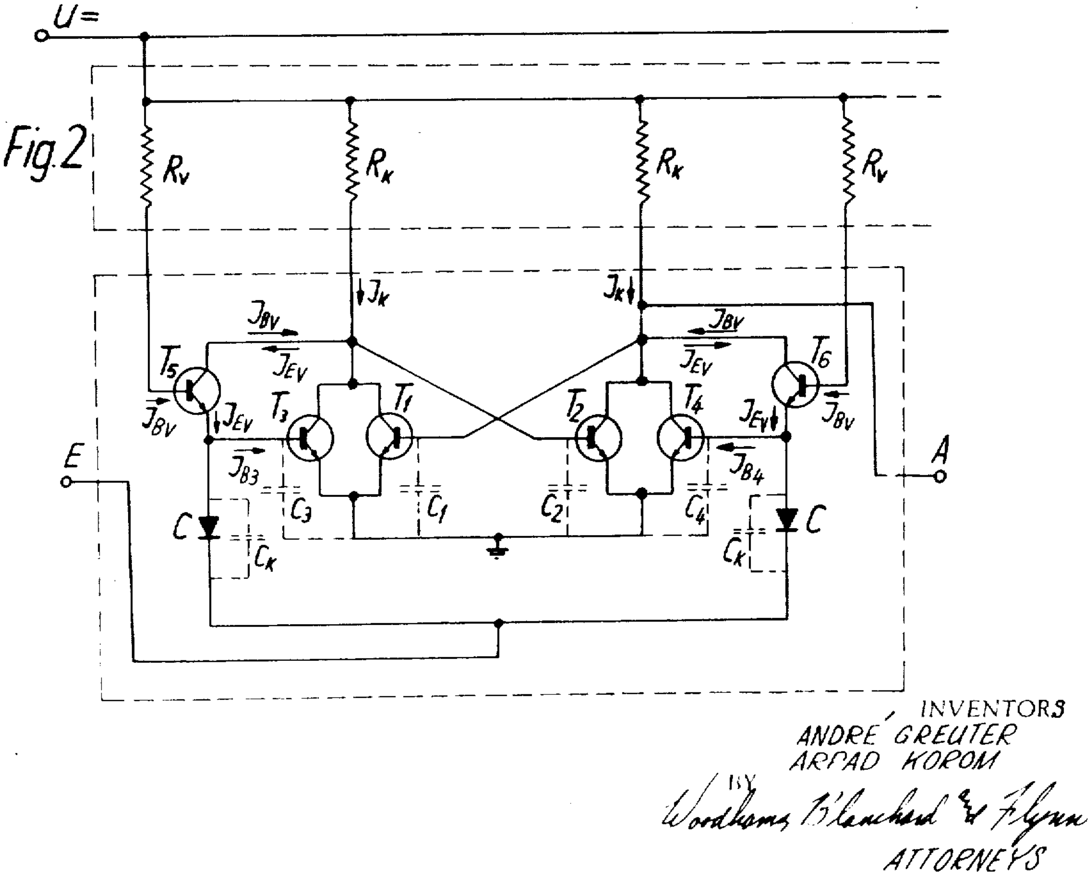
FIG. 2 shows an embodiment of a circuit according to the invention, in which the collector and base currents are supplied via ohmic resistances to the switching, control, and preliminary transistors.

In the simple specific embodiment of a bistable multivibrator according to the invention, shown in FIG. 2, the base resistances $R_B$ are now, in comparison with the multivibrator shown in FIG. 1, replaced by the collector-emitter sections of preliminary transistors $T_5$ or $T_6$. Constant or approximately constant base currents $I_{BV}$ are supplied to the preliminary transistors $T_5$ or $T_6$ via ohmic resistances $R_V$.

In the stable state of the bistable multivibrator shown in FIG. 2, these collector-emitter sections situated between the collector and base of the control transistors $T_3$ and $T_4$ act as ohmic resistances. This will be explained more fully subsequently, with reference to FIG. 3*a* to 3*d*.

Figures 3A, 3B:
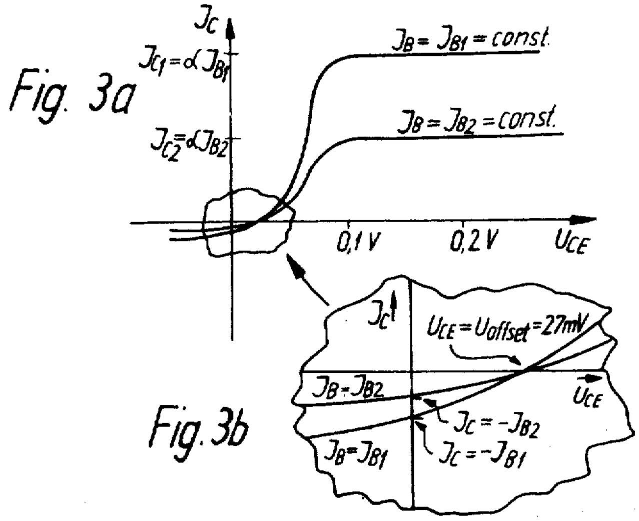
FIG. 3*a* to *d* show diagrams to explain the method of operation of connection arrangements according to the invention.

FIG. 3*a* shows a family of characteristic curves (here consisting of two characteristic lines) for a silicon transistor in the known and generally customary form $I_C=f(U_{CE})$, with $I_B$ as a parameter. Here, however, — in contrast to the generally customary incomplete representation — the exact course of the collector current $I_C$ over the collector-emitter voltage $U_{CE}$ in the region of $U_{CE}<100$ mV up to negative values of $V_{CE}$ is also represented with it. The preliminary transistors $T_5$ and $T_6$ operate in this region, which cannot normally be used. For this reason, the course of the functions $I_C=f(U_{CE})$ in the voltage region of approximately −30 to +50 mV in FIG. 3*b*, is again represented on an enlarged scale. FIG. 3*b* shows, as is obvious, a linear increase of the family of curves in the zero region of the system of coordinates in FIG. 3*a*.

From FIG. 3*b* it is obvious that the entire curves $I_C=f(U_{CE})$ at $I_C=0$ run through the same point on the $U_{CE}$ axis, namely through the offset voltage $U_{offset}$, which, with room temperature, for example, reaches approximately 27 mV. Furthermore, it is obvious from FIG. 3*b* that each individual curve $I_C=f(U_{CE})$ at $U_{CE}=0$ intersects the $I_C$ axis almost at the value $I_C=-I_B$, if the constant base current forming the parameter of the relevant curve is indicated with $I_b$.

Figure 3C:
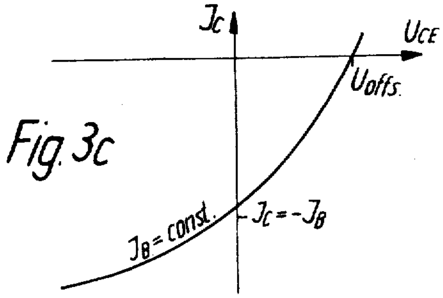

In FIG. 3*c* the general course of the curves $I_C=f(U_{CE})$ shown in FIG. 3*b* is again represented, whereby however the $I_C$ axis is extended for a clearer representation.

Figure 3D:
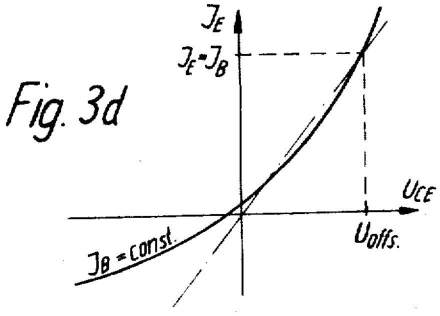

From the curve of the function $I_C=f(U_{CE})$ in FIG. 3*c* it appears with regard to the reference valid for transistors, that the emitter current is equal to the sum of the base current and the collector current, or that $I_E=I_C+I_B$, the general course, represented in FIG. 3*d*, of the function $I_E=f(U_{CE})$.

If one now compares this curve, represented in FIG. 3*d*, of the function $I_E=f(U_{CE})$ with the zero line which is marked dotted in the same figure, and which forms the current voltage characteristic line of a constant ohmic resistance, one recognizes that the function $I_E=f(U_{CE})$ in the voltage region between $U_{CE}=0$ and $U_{CE}$, somewhat greater than $U_{offset}$, agrees with relatively high accuracy with the aforementioned dotted resistance straight line.

The collector-emitter sections of the preliminary transistors $T_5$ and $T_6$ thus act in the aforementioned voltage region from 0 to $U_{offset}$ like ohmic resistances, and therefore exactly like the resistances $R_B$ in FIG. 1. The resistance value of these "resistances" formed from the collector-emitter sections of the preliminary transistors $T_5$ and $T_6$ is thereby approximately $U_{offset}/I_{BV}$, as is obvious from FIG. 3*d*. Thus in the stable state, in the case of the multivibrator circuit in FIG. 2, one obtains the same ratio as that of the multivibrator circuit in FIG. 1, if one selects the base current $I_{BV}$ of the preliminary transistors $T_5$ and $T_6$ in such a way that $U_{off}$-

$_{set}/I_{B_V} = R_B$ (in this case provided that the voltage decrease at the resistance $R_B$ which is arranged in the closed switch step of the multivibrator in FIG. 1, is smaller than or at most equal to $U_{offset}$, i.e., is situated below 27 mV). This latter provision is assumed in the case of the known multivibrator circuit of FIG. 1.

If one considers once again the relationship discussed above which is valid for transistors, that the sum of the collector current and the base current must be equal to the emitter current, there arises from this relationship for the collector current, of the preliminary transistors which are formed from the transistors $T_5$ and $T_6$, $I_{C_V}=I_{E_V}-I_{B_V}$. One can thus divide up the collector current of the preliminary transistors into two partial currents having opposite directions, of which the one partial current is $I_{E_V}$ and the other partial current $I_{B_V}$. The partial $I_{E_V}$ of the collector current of the preliminary transistor is now that which flows from the emitter of the preliminary transistor, and is supplied to the base of the control transistor $T_3$ or $T_4$, and the partial current $I_{B_V}$ of the collector current of the preliminary transistor is the constant current which is supplied to the base of the preliminary transistor.

In the above way of considering the collector-emitter section of the preliminary transistors $T_5$ and $T_6$ as a "resistance" (see FIG. 3*d*), there now flows into this imagined "resistance" on the collector side of the preliminary transistor only the partial current $I_{E_V}$ of the collector current of the preliminary transistor, because also only the emitter current of the preliminary transistor $I_{E_V}$ flows from this imagined "resistance", on the emitter side of the preliminary transistor. The above way of considering the collector-emitter section of the preliminary transistor as a "resistance" therefore implies that the other partial current $I_{B_V}$ of the collector current is considered as an independent current, which flows to the point of connection of the collector of the preliminary transistor to the collectors of the control and switching transistors, i.e., in the case of the above mentioned way of considering the collector-emitter sections of the preliminary transistors as a "resistance", the constant base current $I_{B_V}$ of the preliminary transistor flows, so to speak, to the point of connection of the collector of the preliminary transistor to the collectors of the control and switching transistors. Because of this way of consideration, the collector current of the preliminary transistor $T_5$ and $T_6$ in FIG. 2 is specified in the form of the two opposite directed partial currents $I_{B_V}$ and $I_{E_V}$.

The constant current $I_{B_V}$ which flows to the point of connection of the collector of the preliminary transistor to the collectors of the switching and control transistors can, in this way of consideration, easily be added to the current $I_K$ which flows to the same connection point via the resistance $R_K$. Subsequently, therefore, the designation I*, whereby accordingly $I^* = I_K + I_{B_V}$, will be used for the sum of these two currents $I_K+I_{B_V}$.

As to the above comparison of the FIG. 1 and FIG. 2 multivibrators, in which the collector-emitter sections of the preliminary transistors $T_5$ and $T_6$ have been perceived as imagined "resistances" corresponding to the resistance $R_B$ in FIG. 1, the aforementioned practically identical behavior of the two multivibrators is, strictly speaking, only present when the currents $I_K$ in FIG. 1 are equal to the currents I* in FIG. 2, i.e., therefore when the currents $I_K$ and $I_{B_V}$ in FIG. 2 are lower than the currents $I_K$ in FIG. 1, which can be achieved, for example, through a correspondingly lower voltage $U$ of the current supply source of the multivibrator of FIG. 2.

While with the aforementioned provisions the static behavior of the multivibrator of FIGS. 1 and 2 is practically identical, their dynamic behavior substantially differs.

One difference is apparent from FIG. 3*d*: that is, while the resistance $R_B$ in FIG. 1 is a linear resistance whose current voltage ratio corresponds to the dotted line in FIG. 3*d*, the "resistance" formed from the collector-emitter section of the preliminary transistors $T_5$ and $T_6$ in a non-linear resistance whose current voltage ratio only with positive collector-emitter voltages $U_{CE}$ almost corresponds to the current voltage ratio of the linear resistance $R_B$ in FIG. 1 and with negative collector-emitter voltages $U_{CE}$ shows, however, the ratio of a nonconductive diode. (Strictly speaking, this current voltage ratio, with negative collector-emitter voltages $U_{CE}$ is not that of a nonconductive diode, but that of a transistor in inverse action, which qualitatively at least, is similar).

It has been established at the beginning why, in the case of a linear ohmic resistance like the resistance $R_B$ in FIG. 1, the switching power to be transferred via the coupling capacities (formed from the diodes C) must be substantially greater than in the case of a diode inserted instead of $R_B$. This high switching power required relatively large coupling capacities, and therefore was a cause of the decrease of the upper frequency limit value in multivibrators of the type shown in FIG. 1 connected together into counter networks.

The fact that the "resistance" formed by the collector-emitter sections of the preliminary transistors $T_5$ and $T_6$ exhibits, with positive voltages $U_{CET5}$ or $U_{CET6}$, the same behavior as the resistance $R_B$ in FIG. 1, and with negative voltages $U_{CET5}$ or $U_{CET6}$ however, shows approximately the same behavior as a nonconductive diode, makes it possible, therefore, to select the coupling capacities substantially lower in the multivibrator circuit of FIG. 2 than in the multivibrator circuit of FIG. 1, and therefore remove one of the causes of the reduction of the upper frequency limit.

The difference in the dynamic behavior of the multivibrator circuits of FIG. 1 and 2, which thereby arises, is as follows:

In the multivibrator of either of FIGS. 1 and 2, occurrence of a stepping impulse will switch on one of the switch stages. The base voltage of the control transistor of this switch stage is raised by the stepping impulse above the control transistor collector voltage. Therefore, the voltage above$R_B$ in the FIG. 1 multivibrator and the voltage above the collector-emitter section of the preliminary transistor $T_5$ or $T_6$ in the FIG. 2 multivibrator, becomes negative. This negative voltage increases during the continuance of the stepping impulse, because the collector voltage of the control transistor drops as the switch stage becomes conductive.

In the FIG. 1 multivibrator, current is impelled by this negative voltage through the resistance $R_B$ and increases in proportion of this increase of the negative voltage. However, in the FIG. 2 multivibrator, the corresponding current flow through the collector-emitter section of the preliminary transistor $T_5$ or $T_6$ drops almost immediately after the commencement of the stepping impulse to a relatively low collector-emitter current which is almost independent of this negative voltage, as seen in FIG. 3*d*.

In consequence, the control transistor base voltage, in the FIG. 1 multivibrator, falls during the continuance of the increase flank of, and further continuance of, the stepping impulse, that is until the lower collector voltage of a conductive switch stage is reached. By a sufficiently large coupling capacity and a correspondingly high current flowing through this coupling capacity and created by the increase flank of the stepping impulse, it must be ensured that the control transistor base voltage is kept above the higher collector voltage of a nonconductive stage switch, until the other (turning off) stage of the multivibrator has almost reached the higher collector voltage of a nonconductive switch stage. In the FIG. 2 multivibrator, the control transistor base voltage increases during the increase flank of the stepping impulse, only the steepness of such increase being reduced by the constant current flow through the collector-emitter section of the preliminary transistor.

One can therefore, in principle, in the FIG. 2 multivibrator, select the coupling capacity so small, that the increase in control transistor base voltage, which would result without regard to the collector-emitter current of the preliminary transistor, is exactly equal to the reduction of the increase of control transistor base voltage caused by this current. Thus, the control transistor base voltage, after an initial short lift to voltage values above the aforementioned higher collector voltage of a nonconductive switch stage, remains approximately constant during the continuance of the increase flank of the stepping impulse. In practice, however, for reasons of safety, the coupling capacities are selected not quite so small. More strictly speaking, the highest possible tolerance values are introduced for these collector-emitter currents of the preliminary transistors, and the value of the coupling capacities is then set for these highest possible tolerance values in a manner that the control transistor base voltage remains approximately constant during the increase flank of the stepping impulse. If the collector-emitter currents of the preliminary transistors are below this upper tolerance limit, the base voltage of the control transistor of FIG. 2 normally increases during the increase flank. However, even coupling capacities corresponding to the aforementioned highest possible tolerance values of the collector-emitter currents of the preliminary transistors have capacity values below the internal capacity $C_1$ (see FIG. 2). The capacitance $C_1$ comprises the base-emitter capacity of the transistor $T_1$, the collector-emitter capacities of the transistors $T_2$ and $T_4$, and the capacity of the source of the current $I_K$, or the parasitic parallel capacity of the resistance $R_K$ connected to the collectors of the transistors $T_2$ and $T_4$. As the switch stage containing transistors $T_2$ and $T_4$ is switched from the conductive to the nonconductive state, i.e., during the increase flank of the resulting stepping impulse at the signal output A, capacitance $C_1$ must be charged up from the lower collector voltage of a conductive switch stage to the higher collector voltage of a nonconductive switch stage. Even for extraordinarily disadvantageous values for the highest possible tolerance of the aforementioned collector-emitter currents of the preliminary transistors $T_5$ and $T_6$, the coupling capacities are somewhat below the capacity $C_1$. The steepness of a stepping impulse from the signal output A of a FIG. 2 type multivibrator in a counter network is therefore only sightly impaired by the connected stepping input E of the succeeding switch stage, or because the coupling capacity $C_K$ situated practically above the stepping input E of the aforesaid succeeding counter stage is still connected in parallel to the capacity $C_1$ to be charged up during its increase flank. In the event that, for example, $C_K$=$C_1$/3, The steepness of the increase flank of the stepping impulse can be reduced at most by 25 percent.

In contrast, the coupling capacities of FIG. 1 type multivibrator must, as above mentioned, be substantially larger than the internal capacity $C_1$, for example about two to three times as large, and thereby the steepness of the increase flank of the stepping impulse is reduced by 66 to 75 percent or to a third to a quarter of the steepness with a non-loaded signal output A.

The difference in dynamic behavior between FIG. 1 and FIG. 2 multivibrators which results from the reduction of the coupling capacities made possible by substitution, for the linear resistances $R_B$, of the preliminary transistors $T_5$ and $T_6$, is thus in summary, first the differing variation as a function of time of the base voltage of the transistor receiving the stepping impulse, and second, the differing steepness of the increase flanks of the stepping impulses delivered by the signal output to the succeeding counter stage.

A further substantial difference in dynamic behavior between FIG. 1 and FIG. 2 multivibrators is that in FIG. 1 type multivibrators, the re-charging of the coupling capacities presents difficulties, or requires considerable time, while in FIG. 2 type multivibrators, the re-charging of the coupling capacities proceeds extraordinarily quickly. This will subsequently be explained more fully.

As mentioned, the coupling capacities in FIG. 1 type multivibrators must be substantially larger than the internal capacities $C_1$. In consequence, almost the entire voltage swing of the stepping impulses is transferred from the signal output A of one counter stage of the base-emitter sections of the control transistors of the succeeding counter stage. An exception to this general rule arises only in the transfer of the increase flank of the stepping impulse to the base-emitter section of the control transistor being turned on, because the base-emitter section of this control transistor sets an upper limit on the voltage drop across it as a result of the exponential variation of the base current above the base-emitter voltage. This limitation fails to take effect only if the duration of the increase flank of the stepping impulse is shorter than the delay time of the delay network connected in series to the exponential input resistance, and by which the behavior of the control input or of the base-emitter section of a transistor can be simulated for higher frequencies, and which can easily be combined for lower frequencies to form the input capacity of the base-emitter section. At the end of the increase flank of a stepping impulse the base voltage of the control transistor, of that switch stage which has changed during such increase flank from nonconductive to conductive, is situated at about the aforementioned higher collector voltage of a nonconductive switch stage. As explained above, to maintain this condition, the coupling capacities of the FIG. 1 type multivibrator must be large. After the end of the increase flank of the stepping impulse, the control transistor base voltage of the new conductive switch stage of the FIG. 1 type multivibrator, decreases due to current through resistance $R_B$ away from the control transistor base to the control transistor collector. At the end of the increase flank such collector is at the lower collector voltage of a conductive switch stage. Such continues until either decrease side of the stepping impulse comes, or until the base voltage of the control transistor has reached the aforementioned lower collector voltage of a conductive switch stage.

If the decrease flank of the stepping impulse beings immediately after the increase flank, then the control transistor base voltage decreases caused by the current flow through $R_B$, is still relatively small at the end of such decrease flank and substantially only the negative voltage swing of such decrease flank is transferred to the control transistor base, so that the control transistor base is at the end of such decrease flank at the aforementioned lower collector voltage of a conductive switch stage. On the other hand, if such decrease flank beings after the control transistor base voltage, as a result of the current flowing away via $R_B$, has already fallen to the lower collector voltage of a conductive switch stage, then the control transistor base voltage is further reduced by such decrease flank substantially by the negative voltage swing of such decrease flank i.e., the control transistor base voltage is at the end of such decrease flank below the lower collector voltage of a conductive switch stage by an amount substantially equal to the difference between the higher collector voltage of a nonconductive switch stage and the lower collector voltage of a conductive switch stage.

In the former case, (stepping impulse decrease flank begins immediately after end of increase flank, and at decrease flank end the control transistor base voltage is equal to the aforementioned lower collector voltage of a conductive switch stage), the control transistor base remains at such voltage until the beginning of the increase flank of the next stepping impulse, because the difference in voltage over the resistance $R_B$, and therefore the current through same, is nought. In the latter case (decrease flank begins after control transistor base voltage has already fallen to the lower collector voltage of a conductive switch stage, the control transistor base voltage increases, between stepping impulses, to the lower collector voltage of a conductive switch stage, since the time period from the end of the increase flank to the beginning of the decrease flank of one stepping impulse is approximately equal to the time period from the end of the decrease flank of the one stepping impulse to the beginning of the increase flank of the next stepping impulse, and the voltage differences which the control transistor base voltage passes through during these time periods are also equal. The same applies when the decrease flank begins at a point in time after the end of the increase flank at which the control transistor base voltage is at some intermediate value between the higher collector voltage of a nonconductive switch stage and the lower collector voltage of a conductive switch stage. Consequently, the control transistor base voltage, of a switch stage switched conductively the increase flank of a stepping impulse, is equal to the lower collector voltage of a conductive switch stage at the beginning of the increase flank of the subsequent stepping impulse, in the FIG. 1 multivibrator.

Such subsequent stepping impulse now renders the other switch stage conductive, and acts on the control transistor base voltage in the switch stage under consideration only in the sense that its increase flank raises such base voltage by almost the positive voltage swing of this increase flank, and its decrease flank again drops such base voltage by almost the negative voltage of such decrease flank. Consequently, at the end of the decrease flank of this subsequent stepping impulse, such base voltage is again at the lower collector voltage of a conductive switch stage. A substantial voltage change of the control transistor base voltage in consequence of the flow of current via $R_B$, does not occur during the continuance of said subsequent stepping impulse, because simultaneously as the control transistor base voltage is raised by such increase flank, the control transistor collector voltage increases accordingly, as the switch stage considered switches from the conductive to the nonconductive state during said increase flank of said subsequent stepping impulse.

As a result of the above, in a FIG. 1 type multivibrator, the control transistor base voltage of a nonconductive switch stage is still equal to the lower collector voltage of a conductive switch stage at the end of the decrease flank of the stepping impulse which precedes the stepping impulse whose increase flank turns on this switch stage, while this control transistor base voltage, at the beginning of said increase flank, must be equal to the higher collector voltage of a nonconductive switch step, if it is to be guaranteed that this latter stepping impulse actually turns on this switch stage. The control transistor base voltage must therefore, between two stepping impulses, be raised from the lower collector voltages of a conductive switch stage to the higher collector voltage of a nonconductive switch stage, and in addition, as mentioned, the relatively large coupling capacity connected to the base of this control transistor, and moreover the input capacity of the base-emitter section of the control transistor, must be charged up via the resistance $R_B$ at about the voltage difference between the higher collector voltage of a nonconductive switch stage and the lower collector voltage of a conductive switch stage.

There thus arises in FIG. 1 type multivibrators, because of the necessary large coupling capacities, firstly a relatively great voltage difference (that is, the entire voltage difference between the higher collector voltage of a nonconductive switch stage and the lower collector voltage of a conductive switch stage) to which the coupling capacity and the input capacity of the base-emitter section of the control transistor must be charged between two stepping impulses, and secondly, a relatively large charging time constant (equal to the product of $R_B$ and the sum of the coupling capacity and input capacity). Assuming the control transistor base voltage, at the beginning of the increase flank of the stepping impulse which turns on the relevant switch stage, is less than the control transistor collector voltage by 5 percent of the voltage difference between the higher collector voltage of a nonconductive switch stage and the lower collector voltage of a conductive switch stage, then the necessary charging time is equal to triple said charging time constant.

If, in a FIG. 1 type multivibrator the coupling capacities were lowered from, for example, triple the value of the above mentioned capacity $C_1$ (see FIG. 3 to a third of this capacity $C_1$, or (as this capacity $C_1$ is approximately equal to one and half times the input capacity of the base-emitter section of a control transistor such as $C_3$ and $C_4$ in FIG. 2) from 4.5 times the input capacity of the base-emitter section of the control transistor to half this input capacity, then firstly the aforementioned charging time constant would be reduced by the factor 3, and secondly, the voltage difference to be passed during the aforementioned charging up time would become substantially smaller. This is because only a fraction of the voltage swing of the increase and decrease flank of the stepping impulse would be transferred to the base-emitter sections of the control transistors, on account of the substantially smaller coupling capacity, that is to say, if the coupling capacity is equal to half the input capacity, only a third of this voltage swing. By analogy, the control transistor base voltage of a nonconductive switch stage, at the end of the decrease flank of the stepping impulse which precedes the stepping impulse turning on this switch stage, would be at about a third of the negative voltage swing of the decrease flank of this stepping impulse below the aforementioned higher collector voltage of a nonconductive switch stage. This voltage difference between the base voltage and the collector voltage of the control transistor would, in accordance with the assumption, have to be reduced during the charging time to 5 percent of the total voltage difference between the higher collector voltage of a nonconductive switch stage and the lower collector voltage of a conductive switch stage, i.e., to 15 percent of its initial value. The charging time necessary for this is 1.9 times the charging time constant. As the latter is smaller by the factor 3 than the charging time constant for large coupling capacities, the charging time, for coupling capacities of a third of the capacity $C_1$, would be 0.63 times the charging time constant for coupling capacities of triple the capacity $C_1$. By reduction of the coupling capacities from triple to a third of the aforementioned capacity $C_1$, there might therefore be achieved for a FIG. 1 type multivibrator, a reduction of the aforementioned charging time from triple to 0.63 times the charging time constant for coupling capacities of triple the aforementioned capacity $C_1$ and therefore a reduction of the aforementioned charging time by the factor 5. However, as discussed above, it is not possible in FIG. 1 type multivibrators to reduce the coupling capacities, and therefore not possible to shorten the aforementioned charging time by reducing the coupling capacities.

On the other hand and as discussed above, such a reduction of the coupling capacities in FIG. 2 type multivibrators is immediately possible, and with this the aforementioned charging time can also be shortened.

In FIG. 2 type multivibrators there is a further cause of an additional considerable reduction of the aforementioned charging time: that is to say, if the collector-emitter voltage of a preliminary transistor $T_5$ or $T_6$, which is of course equal to the voltage between collector and base of the coordinated control transistor $T_3$ or $T_4$, becomes substantially greater than the offset voltage ($W_{offset} \approx 27$ mV), then the collector current of the preliminary transistor (and with this also the emitter current of the preliminary transistor) increases quite substantially, as FIG. 3a shows, and reaches with collector-emitter voltages of the preliminary transistor of more than about 70 mV, $\alpha$ times the current $I_{b_V}$ supplied to the base of the preliminary transistor. If this base current supplied to the base of the preliminary transistor $T_5$ or $T_6$ is now equal to or greater than $I_k/\alpha$, then the entire current $I_k$, and moreover also the current $I_{B_V}$ from the moment at which the base voltage of the control transistor is situated at more than about 70 mV below the collector voltage of the control transistor, flows through the preliminary transistor, and charges up the input capacity of the base-emitter section of the control transistor $C_3$ or $C_4$, as well as the capacity $C_K$ connected to the base of the control transistor. Thereby, the aforementioned charging time is once again considerably shortened, so that a further shortening to about 1/20 of the charging time of FIG. 1 type multivibrator results beyond the shortening to be expected because of the reduction of the coupling capacities (at, for example, the above mentioned factor 5), if by comparison, the assumption is proceeded from, that the "resistance" formed from collector-emitter section of the preliminary transistors in the FIG. 2 type multivibrator and the resistance $R_B$ of the FIG. 1 type multivibrator are equal in the static state of the multivibrators, and furthermore the sum of the currents $(2I_k + 2I_{B_V})$ supplied to the FIG. 2 type multivibrator is equal to the sum of the currents $2I_K$ supplied to the FIG. 1 type multivibrator.

With such a considerable shortening, the aforementioned charging time no longer plays a part in the attainable upper limit value of the repetition frequency. This is apparent because the sum of the coupling capacity $C_K$ and the input capacity $C_3$ or $C_4$ of the control transistor is smaller than the sum of the coupling capacity $C_K$ and the aforementioned capacity $C_1$ (because $C_1$ is made up of the input capacity of the base-emitter section of the switching transistor $T_1$ and the collector-emitter capacities of the transistors $T_2$ and $T_4$, as well as the parasitic parallel capacity of the resistance $R_V$), and the capacity $C_1+C_k$ is charged up in each case during the increase flank of a stepping impulse, and the capacity $C_3+C_r$ in each case during the aforementioned charging time by the same current $(I_k+I_{B_V})$. As a result, the aforementioned charging time has to be shorter than the increase flank of the stepping impulse, and therefore it is no longer the aforementioned charging time, but the period of the increase flank of a stepping impulse which determines the upper limit value of the attainable repetition frequency.

Thus, the second substantial difference in the dynamic behavior between the FIG. 1 and FIG. 2 multivibrators is that in the FIG. 1 multivibrator the aforementioned charging time determines the upper limit value of the repetition frequency, while in the FIG. 2 multivibrator the aforementioned charging time no longer plays any part in the upper limit value of the repetition frequency, but this upper limit value is determined by the duration of the increase flank of a stepping impulse.

EMBODIMENTS OF FIGS. 4 – 6

The multivibrator connection shown in FIG. 2 can be further improved for use in integrated circuits by replacing the ohmic resistances $R_K$ and $R_V$ with constant current sources. Such affords the advantage of a considerable saving in space and therefore offers the possibility of accommodating 5 to 10 multivibrators instead of one as formerly, on a carrier crystal having the same surface area.

Figure 4:
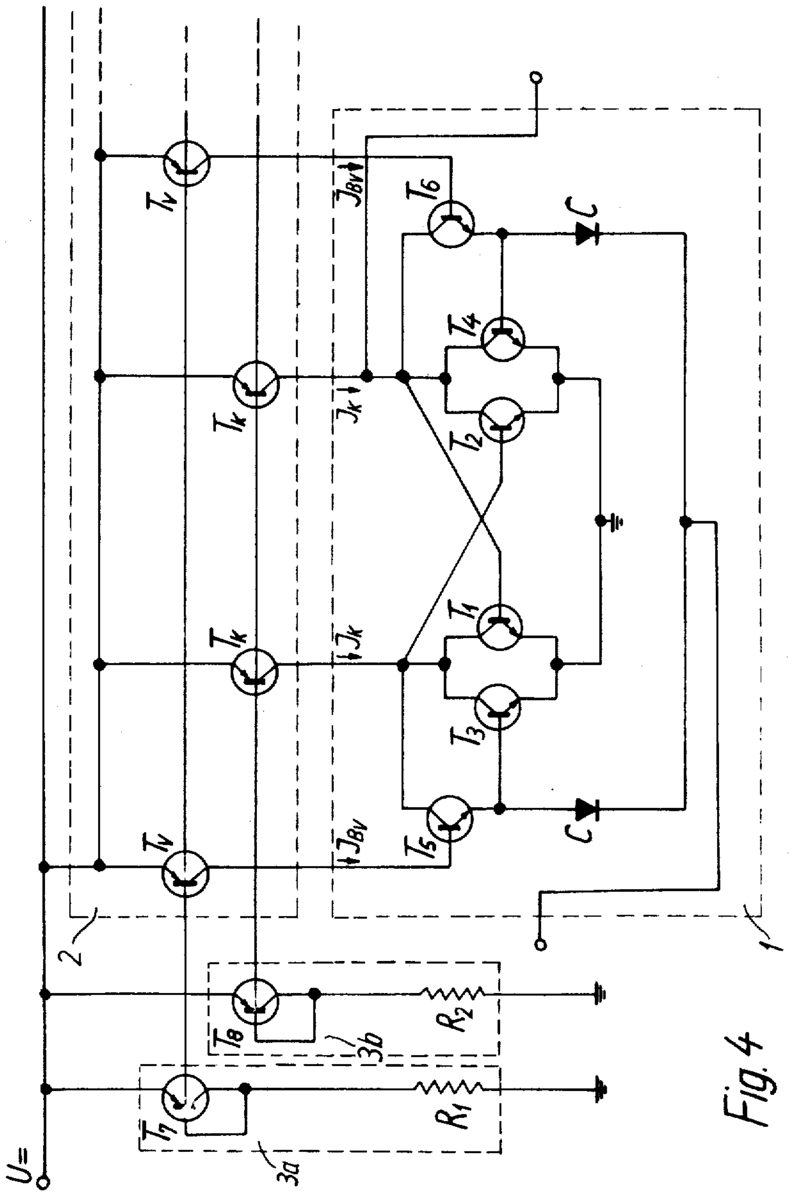
FIG. 4 shows a first modified circuit according to the invention, in which the collector and base currents are supplied form constant current sources to the switching, control and preliminary transistors, whereby two groups of constant current sources, and in each case a separate reference voltage source are provided for each group.
Figure 5:
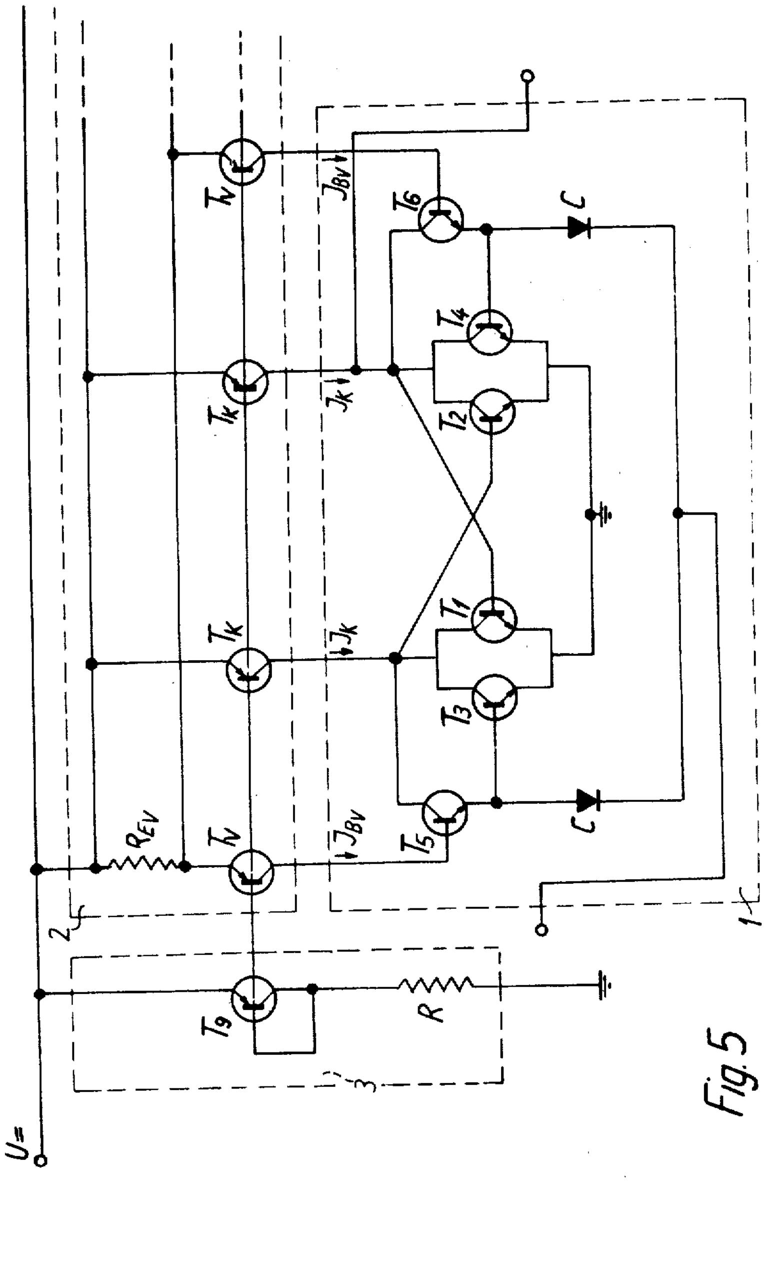
FIG. 5 shows a second modified circuit according to the invention in which the collector and base currents are supplied from constant current sources to the switching, control, and preliminary transistors, whereby two groups of constant current sources and a common reference voltage are provided for both groups.
Figure 6:
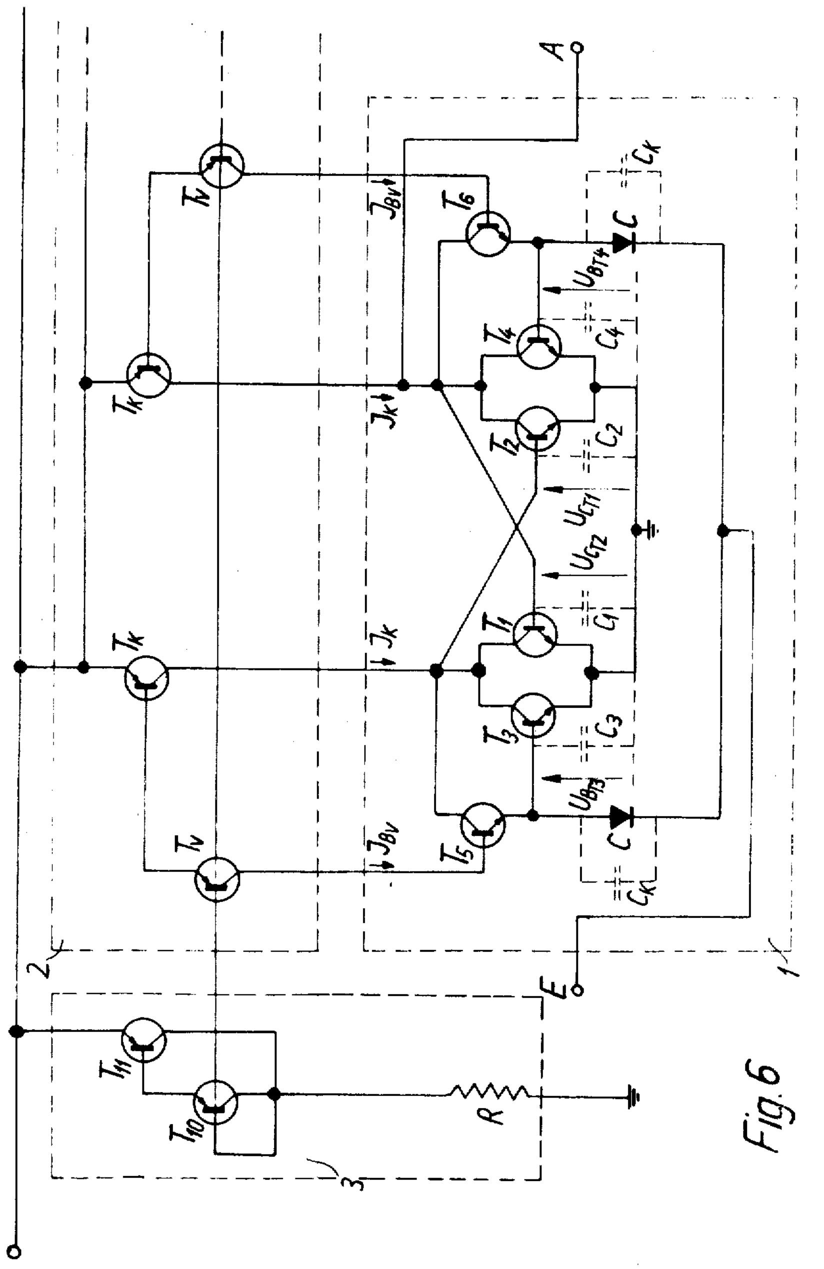
FIG. 6 shows a third modified circuit according to the invention, in which the collector and base currents, are supplied form constant current sources to the switching, control, and preliminary transistors, whereby only one group of constant current sources and reference voltage source are provided for this group.

FIGS. 4 to 6 show three examples of how these constant current sources can be constructed. The essential multivibrator part, i.e., the dotted line block including the switching, control, and preliminary transistors $T_1$ to $T_6$, corresponds in all these examples, in structure and method of operation, to the multivibrator of FIG. 2. A repeated explanation of the method of operation of the multivibrator part in FIGS. 4 to 6 is therefore unnecessary. It may merely be mentioned that the above explanation of the operation of the FIG. 2 multivibrator proceeded from the fact that the currents $I_K$ and $I_{B_V}$ supplied to the multivibrator part via the resistances $R_K$ and $R_V$ are approximately constant (that is the case with the connection in FIG. 2, if the battery voltages $U_{..}$ and the resistances $R_K$ and $R_V$ are so regulated that the greatest part of the battery voltage falls across $R_K$ or $R_V$).

In principle, the resistances $R_K$ and $R_V$ in FIG. 2 in the case of the exemplified embodiments in FIGS. 4 to 6 are replaced by transistors of a type of line complementary to the type of line of the transistors $T_1$ to $T_6$, i.e., of opposite polarity) at the base-emitter sections of which a constant (reference) voltage is situated, and whose base currents are therefore constant. Since, in the case of surface transistors, which come into consideration exclusively with connections of the present type, as is also obvious, for example, from the characteristic line in FIG. 3*a*, a constant collector current $I_C$, independent of the collector-emitter voltage $U_{CE}$, arises with a constant base current $I_B$ (as long as the collector-emitter voltage $U_{CE}$ is situated above about 0.1 v), the transistors inserted in FIGS. 4 to 6 instead of resistances $R_K$ and $R_V$ thus form constant current sources.

So that the collector currents delivered by these transistors inserted instead of the resistances $R_K$ and $R_V$ now remain constant even with temperature changes, the reference voltage applied to the base-emitter sections of these transistors is altered with the temperature, in the case of the exemplified embodiments in FIGS. 4 to 6. Resistances dependent upon temperature and charged with constant current serve to create the reference voltages dependent upon temperature, which (resistances) in the case of the exemplified embodiments in FIGS. 4 to 6, are likewise formed from transistors whose type of line is the same as that of the transistors which form constant current sources.

In particular, the exemplified embodiments in FIGS. 4 to 6 consist in each case of a first block 1 which is framed in dotted lines, and forms the aforementioned multivibrator part, or of a large number of such blocks 1 connected together into a counter chain, a second block 2 framed in dotted lines, which contains the constant current sources for the block or blocks 1, or the transistors which form these constant current sources, and one or more third blocks 3, framed in dotted lines, which contain the aforementioned resistances dependent upon temperature, or the transistors forming the same, also one or more ohmic resistances R or $R_1$, $R_2$, for supplying the resistances dependent upon temperature with a constant current from the current supply source provided for the connection.

The blocks 1 in FIGS. 4 to 6 which form the multivibrator parts correspond completely, in structure and method of operation, to the block 1 in FIG. 2, as already mentioned, and the blocks 2 (in conjunction with the blocks 3, also the resistances R or $R_1$, $R_2$) in FIGS. 4 to 6 correspond in their method of operation to the block in FIG. 2 framed in dotted lines, which contains the resistances $R_K$ and $R_V$. In particular, the resistances $R_K$ within the blocks 2 are replaced by the transistors $T_K$, and the resistances $R_V$ within the blocks 2 by the transistors $T_V$.

The exemplified embodiments in FIGS. 4, 5 and 6 differ from one another merely in the principle and method by which the reference voltages at the base-emitter sections of the transistors $T_K$ and $T_V$ are created.

In the exemplified embodiment in FIG. 4, the base-emitter sections of all the transistors $T_V$ which deliver the currents $I_{B_V}$ on the collector side (in the case of several blocks 1 connected together into a counter chain, and therefore also in the case of the additional transistors $T_V$ serving to supply these further blocks 1 with currents $I_{B_V}$) are connected in parallel to each other, and connected to the common reference voltage source 3*a*. The reference voltage source 3*a* is formed from a resistance dependent upon temperature, which is charged via the ohmic resistance $R_1$ with a constant current, and which consists of a transistor $T_7$ which is identical to the transistors $T_V$, and whose emitter forms the one pole and its collector and base electrodes connected together, form the other pole of the resistance dependent upon temperature. As the same base-emitter voltage as at the transistor $T_7$ is situated at the base-emitter sections of the transistors $T_V$, which are of course connected in parallel to the base-emitter section of the transistor $T_7$, and in accordance with the above provision, the transistors $T_V$ are identical to the transistors $T_7$, the collector currents of the transistors $T_V$ must also be equal to the collector current of the transistor $T_7$, and the latter, if one can disregard the base currents of the transistor $T_7$ and of the transistors $T_V$, is equal to the current supplied via the resistance $R_1$, and is consequently constant practically independently of the temperature. The base-emitter voltage of the transistor $T_7$ is thus so adjusted automatically, independently of the temperature in each case, that the collector current of the transistor $T_7$, and therefore also the collector currents of the transistors $T_V$, are approximately equal to the constant current supplied via the resistance $R_1$. Strictly speaking, the desired collector current of the transistors $T_V$ or $I_{B_V}$, and additionally the sum of all base currents of the transistors $T_V$, also of the transistor $T_7$, with n transistors $T_V$, therefore (n+1) times the base current $I_{B_7}$ of the transistor $T_7$ has to be supplied via the resistance $R_1$. The resistance $R_1$ accordingly has to be so regulated that $R_1 \cdot (I_{B_V} + (n+1) I_{B_7}) = U - U_{BE_7}$, where the battery voltage is indicated with $U_{11}$, and the base-emitter voltage of the transistor $T_7$ in normal temperature is indicated with $U_{BE_7}$. Furthermore, in the case of the exemplified embodiment in FIG. 4, the transistors $T_K$ which deliver the currents $I_K$ on the collector side are connected in parallel to each other, and connected to the common reference voltage source *3b*. The reference voltage source *3b*, like reference voltage source *3a*, is formed from a resistance dependent upon temperature which is charged via the ohmic resistance $R_2$ with a constant current, and which in the same way as in the reference voltage source *3a*, consists of a transistor $T_8$ which is identical to the transistors $T_K$ , the emitter of which (transistor $T_8$) forms the one pole, and the collector and base electrodes of which, connected together, form the other pole of the resistance which is dependent upon temperature. The method of operation of the reference voltage source *3b* is the same as that of the reference voltage source *3a*, and analogously with the yields there, $R_2$ must therefore be so regulated, that $R_2\ (I_K+(n+1)I_{B_8}+U_= - U_{BE_8}$, where the batetry voltage is indicated with $U_{11}$, the base-emitter voltage with $U_{BE_8}$, and the base current of the transistor $T_8$ in normal temperature with $I_{B_8}$.

In the case of the exemplified embodiment in FIG. 5, the base-emitter sections of all the transistors $T_K$ which deliver the currents $I_K$ on the collector side are connected in parallel to each other in the same way as in the exemplified embodiment in FIG. 4, and connected directly to the common reference voltage source 3, whose design and method of operation is the same as that of the reference voltage source *3b* in FIG. 4. In contrast to the exemplified embodiment in FIG. 4, however, in the exemplified embodiment in FIG. 5, no second reference voltage source like the reference voltage source 3a in FIG. 4 is provided for the transistors $T_V$, which likewise have their base-emitter sections connected to one another, and deliver on the collector side the currents $I_{B_V}$, but the reference voltage situated at the base-emitter sections of the transistors $T_V$ is delivered by the same reference voltage source 3, to which the base-emitter sections of the transistors $T_K$ are also connected. If the base-emitter sections of the transistors $T_V$ were now to be connected like the base-emitter sections of the transistors $T_K$, directly to the reference voltage source 3, then, in accordance with above explanations — the identical nature of the transistors $T_V$ and $T_K$ assumed — the collector currents of the transistors $T_V$ would have to be equal to the collector currents of the transistors $T_K$, and therefore $I_{B_V}$ be equal to $I_K$. As a rule, however, $I_{B_V}$ should be substantially lower than $I_K$, so that the voltage difference between collector and base of the control transistor of the closed switch stage of the multivibrator is sufficiently great in the stable state of the latter, to ensure the stability of this state, and therefore the stability of the multivibrator within the framework of the possible production and operation parameter tolerances with sufficient safety. In order to keep $I_{B_V}$ lower than $I_K$, the base-emitter voltage of the transistors $T_V$ must be lower than the base-emitter voltage of the transistors $T_K$, and this is achieved in the case of the exemplified embodiment in FIG. 5, in that the transistors $T_V$ having their base-emitter sections connected in parallel to one another, are connected via the common emitter resistance $R_{E_V}$ to the reference voltage source 3. In order to achieve a definite desired ratio of $I_{B_V}/I_K$, this resistance $R_{E_V}$ has to be so regulated that $$R_{E_V}\cdot I_{B_V} n(1+\alpha_{T_V}) = \alpha_{T_V}\cdot 23.9mV(1n\alpha_{T_V} - 1n\alpha_{T_K} - 1nI_{B_V}/I_K$$

where the number of transistors $T_V$ connected to the reference voltage source 3 is indicated with n, the current increase $T_V$ of the transistors $T_V$ with the collector current $I_B$ is indicated with $\alpha_{T_V}$, and the increase of the transistors $T_K$ with the collector current $T_K$ is indicated with $\alpha_T V$. From this regulation equation it arises that the resitance $R_{E_V}$ is independent of the absolute value of the reference voltage delivered by the reference voltage source 3, or that the desired ratio $I_{B_V}/I_K$ even with temperature changes and alterations of the absolute value of the reference voltage conditioned by them, remains maintained at the same level. The desired collector current of the transistors $T_K$, therefore $I_K$, and additionally the sum of all base currents of the transistors $T_K$ therefore, $R(I_K+(n+1)I_K/\alpha T_T + nI_{B_V}/\alpha_{T_V}) = U - U_{BE_V}$, where the battery voltage is in- provided for supplying the resistance dependent upon temperature and formed by the transistor $T_9$, with a constant current. For the regulation of R there results in the case of n transistors $T_K$ and n transistors $T_V$, also in the case of identical nature of the transistor $T_9$ and the transistors $T_K$ therefore, $R(I_K+(n+1)I_K/\alpha T_{T_K} + nI_{B_V}/\alpha_{T_V}) = U_= - U_{BE_9}$, where the battery voltage is indicated with $U_=$, and the base-emitter voltage of the transistor $T_9$ or the desired reference voltage in normal temperature is indicated with $U_{BE}$ .

In the case of the exemplified embodiments in FIGS. 4 and 5, as is obvious, two more ohmic resistances are now required in each case for a counter chain made up of multivibrators in accordance with the block 1, whereby the number of counter stages of this counter chain may not be too large, because with this number of counter stages the necessary number n of transistors $T_V$ and $T_K$ also increases accordingly, and a relatively satisfactory independence of temperature of the currents $I_K$ and $I_{B_V}$ is only guaranteed when the aforementioned sum of the base currents, which (sum) is supplied via the resistances $R_1$ and $R_2$ in FIG. 4, or via the resistance R in FIG. 5, additionally to the collector current of the transistors $T_V$ or $T_K$, desired in each case, (the sum) of these transistors or at least their possible alteration within the temperature region provided is still small compared with the aforementioned desired collector current. As this sum of the base currents increases proportional to *n*, or proportional to twice the number of counter stages, the number of counter stages or the blocks 1, whose coordinated transistors $T_K$ and $T_V$ can be supplied from common reference voltage sources *3a* and *3b* (FIG. 4)or from a common reference voltage source 3 (FIG. 5), is thus limited upwards.

Nevertheless, the exemplified embodiment in FIG. 5, in spite of the same number of 2 ohmic resistances for a limited number of counter stages, has, in relation to the exemplified embodiment in FIG. 4, the advantage that the resistance $R_{E_V}$ in FIG. 5—equally high currents $I_B$ assumed in the case of both exemplified embodiments — can be substantially smaller than the resistance $R_1$ in FIG. 4, that is to say, up to about the factor 20, and in accordance with the smaller resistance value, the space requirement of the resistance $R_{E_V}$ in integrated connection circuits is also substantially smaller than that of the resistance $R_1$.

In connection with the statements regarding the exemplified embodiment in FIG, 5, it had already been mentioned then that the currents $I_{B_V}$ should, for reasons of stability, be substantially smaller than the currents $I_K$. This offers, with regard to the method of connection of the transistors $T_V$ and $T_K$, the possibility applied in the case of the exemplified embodiment in FIG. 6, of connecting the base-emitter sections of the transistors $T_V$ and $T_K$ in series. With such a connection in series of the base-emitter sections by one transistor $T_V$ and one transistor $T_K$ in each case, the current $I_K$ delivered on the collector side by the transistor $T_K$ is greater by the current increase $\alpha_{T_K}$ of the transistor $T_K$, than the emitter current of the transistor $T_V$ which is supplied to the base of the transistor $T_K$, i.e., the current $I_{B_V}$ delivered on the collector side by the transistor $T_V$ is somewhat smaller than the current $I_K$, by the current increase factor $\alpha_{T_K}$.

Advantageously, as shown in FIG. 6, the base-emitter section of the transistors $T_V$ and $T_K$ coordinated in each case with the same switch stage of the multivibrator part 1, are connected in series. The connections in series of the base-emitter sections of one transistor $T_V$ and one transistor $T_K$ in each case are then connected in parallel to each other with the common reference voltage source 3, as in FIG. 6. The reference voltage source 3, in the case of the exemplified embodiment in FIG. 6, is likewise formed from a resistance dependent upon temperature, which is charged via the ohmic resistance R with the constant current, and which in the same way as with the exemplified embodiments in FIGS. 4 and 5, consists of an identical reproduction of the base-emitter sections of the transistors connected to the reference voltage source, and accordingly of a transistor $T_{10}$ identical to the transistor $T_V$, and a transistor $T_{11}$, identical to the transistors $T_K$, whose base-emitter sections, in the same way as the base-emitter sections of the transistors $T_V$ and $T_K$ are connected in series, and to whose base-emitter sections connected in parallel, the series connections of the base-emitter sections of the transistors $T_V$ and $T_K$ are connected in parallel. Since therefore, on account of the identical nature of the transistor $T_{10}$ to the transistors $T_V$, and of the transistor $T_{11}$ to the transistors $T_K$, also on account of the same voltages at the connection in series of the base-emitter sections of the transistors $T_{10}$ and $T_{11}$ and of the transistors $T_V$ and $T_K$, the base-emitter voltage of the transistor $T_{10}$ is equal to the base-emitter voltage of the transistors $T_V$, and the base-emitter voltage of the transistor $T_{11}$ is equal to the base-emitter voltage of the transistors $T_K$, the collector currents of the transistors $T_V$ must, on account of the aforesaid identical nature of $T_{10}$ and $T_V$, also be equal to the collector current of the transistor $T_{10}$, and the collector currents of the transistors $T_K$ be equal to the collector current of the transistor $T_{11}$, and the collector currents of the transistors $T_{10}$ and $T_{11}$, if one can disregard the base currents of the transistor $T_{10}$ and of the transistors $T_v$, are equal to the current supplied via the resistance R, and are consequently constant, practically independently of the temperature. Strictly speaking, the desired collector currents $I_{B_V}$ and $I_K$ of the transistors $T_v$ and $T_k$, and in addition the sum of all the base currents of the transistors $T_V$, also of the transistor $T_{10}$, with n transistors $T_V$, therefore $(n+1)$ times the base current of the transistors $T_V$, or $(n+1)/\alpha_T$ times the emitter current of the transistors $T_V$, or $(n+1)/\alpha_{T_K}(\alpha_{T_V}+1)$ times the collector current $I_K$ of the transistors $T_K$ has to be supplied via the resistance R in FIG. 6. As furthermore $I_{B_V}$, in the case of the exemplified embodiment in FIG. 6 is equal to $I_K \alpha_{T_V}/\alpha_{T_K}(\alpha_{T_V}+1)$, the resistance R in the case of the exemplified embodiment in FIG. 6, has accordingly to be so regulated that $$R \cdot I_x \left(1+\frac{1}{\alpha_{T_K}}+\frac{n}{\alpha_{T_V}(\alpha_{T_V}+1)}\right)=U-(U_{BE_{10}}+U_{BE_{11}})$$

where the battery voltage is indicated with U , the base-emitter voltages or the desired reference voltage in normal temperature situated at the transistors $T_{10}$ and $T_{11}$ is indicated with $(U_{BE_{10}}+U_{BE_{11}})$ the current increase of the transistors $T_K$ with the collector current $I_K$ is indicated with $\alpha_{T_K}$, and the current increase of the transistors $T_V$ with the collector current $I_{B_V}$ is indicated with $\alpha_{T_V}$.

The exemplified embodiment in FIG. 6, in relation to the exemplified embodiments in FIGS. 4 and 5, has the advantage that first, only one ohmic resistance is still required for a counter chain made of of multivibrators in accordance with block 1, and that secondly, the number of counter stages of this counter chain, in the case of an assumed equally satisfactory independence of temperature of the currents $I_K$ and $I_{B_V}$ may be substantially greater than in the case of the exemplified embodiments in FIGS. 4 and 5, the latter for the reason that in the case of the exemplified embodiment in FIG. 6, the ratio of the sum of the base currents flowing via the resistance R to the total current of the resistance R is substantially smaller for a definite number n of transistors $T_V$ or $T_K$, than the corresponding ratio in the case of the exemplified embodiments in FIGS. 4 and 5 for the same number n of transistors $T_V$ or $T_K$, that is to say, by approximately the factor $(\alpha_{T_V}+2)$ . As in the event of equality of these ratios equally satisfactory independence of temperature of the currents $I_K$ and $I_{B_V}$ results, consequently the number of counter stages or the number of blocks 1 whose coordinated transistors $T_K$ and $T_V$ can be supplied from a common reference voltage source 3 or from common reference voltage sources 3*a* and 3*b*, may be greater, in the case of the exemplified embodiment in FIG. 6, by the factor $(\alpha_{T_V}+2)$, than in the case of the exemplified embodiments in FIGS. 4 and 5. Besides these considerable advantages, the exemplified embodiment in FIG. 6 has also however, in relation to the exemplified embodiments in FIGS. 4 and 5, one disadvantage, namely that the ratio of the currents $I_{B_V}$ and $I_K$ to each other in the case of the exemplified embodiment in FIG. 6, is not freely selectable, in contrast to the exemplified embodiments in FIGS. 4 and 5, but is rigidly predetermined by the current increases $\alpha_{T_K}$ and $\alpha_{T_V}$ of the transistors $T_K$ and $T_V$.

Supplementarily it is to be observed with regard to FIGS. 4 to 6, that in each individual one of these figures several multivibrator parts 1 can also be provided, which for example, can be connected together into a counter chain. The block 2 then contains for each block 1 a group of two transistors $T_V$ and two transistors $T_K$ in the same connection as stated in the relevant figure. The coordinated transistors $T_V$ and $T_K$ can be supplied from the reference voltage source or sources represented in the relevant figure, up to a fixed number of further blocks 1 or of counter stages of a counter chain.

EMBODIMENT OF FIGURE 7

Figure 7:
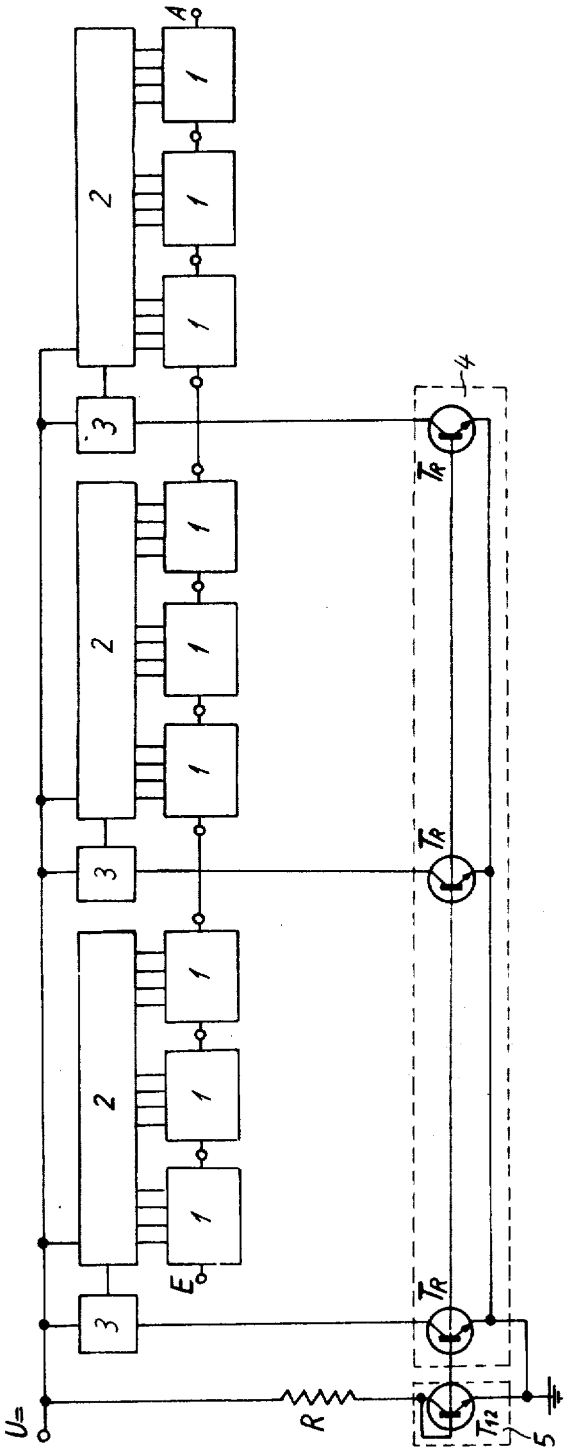
FIG. 7 shows a block diagram of a circuit according to the invention, which forms a counter network here having three integrated switching circuits, each having three counter stages, in accordance with the modification of FIGS. 5 or 6, and a fourth integrated circuit which delivers the reference currents for the three integrated switching circuits.

In FIG. 7 a counter chain is represented as an example of a connection arrangement according to the invention, containing a large number of multivibrator parts 1, which (chain) consists altogether of four integrated switching circuits. Of these four integrated switching circuits three contain a reference voltage source 3 in each case, as in FIG. 6, a constant current source block 2 as in FIG. 6, and three multivibrator parts 1 as in FIG. 6 or in FIG. 2. The nine bistable multivibrators contained in the three integrated switching circuits are, as is evident in FIG. 7, connected together into a counter chain, whose input is the input E of the first bistable multivibrator, and whose output is the output A of the last bistable multivibrator of the chain.

The constant currents, with which the reference voltage source 3 are charged, and which in the case of the exemplified embodiments in FIGS. 4 to 6, are drawn via ohmic resistances directly from the current supply source, are delivered by constant current sources, in the counter chain in FIG. 7, which (sources) consist in each case of a transistor $T_R$, whose type of line (i.e., polarity) is the same as the type of line of the transistors contained in the multivibrator parts 1, and which delivers on the collector side the relevant constant current. The base-emitter sections of the transistors $T_R$ are connected to one another in parallel, and connected to a common reference voltage source 5, which consists of a resistance dependent upon temperature and charged via the resistance R with a constant current. The resistance dependent upon temperature is formed from a transistor $T_{12}$ identical to the transistors R, the emitter of which ($T_{12}$) forms the one pole, and its collector and base electrodes connected together form the other pole of the resistance dependent upon temperature. The method of operation of these constant current sources combined in block 4, in conjunction with the reference voltage source 5, as well as with the current supply resistance R is the same as the method of operation, discussed above in connection with FIG. 4, of the constant current sources formed from the transistors $T_V$, in conjunction with the reference voltage source 3a, also with the current supply resistance $R_1$. A repeated fuller explanation of the method of operation of blocks 4 and 5 in FIG. 7 is therefore spared.

The counter chain in FIG. 7 is distinguished by an extraordinarily great temperature stability, which can be traced to the fact that the individual reference voltage sources 3 are only very small, that is to say, loaded with the base currents of 6 transistors $T_V$ in each case, so that over wide regions of temperature, stability of the currents $I_K$ and $I_B$ which are supplied to the multivibrator parts 1, is achieved. Reference is made in this connection to the statements with regard to FIG. 6, according to which a large number of counter stages can be supplied from a reference voltage source for a still relatively satisfactory independence of temperature of these currents. Vice versa, in the case of a relatively small number of counter stages which are supplied from a reference voltage source, the independence of temperature is correspondingly better.

Furthermore, the counter chain in FIG. 7 is distinguished by the fact that it contains only a single ohmic resistance, which in the present case is combined with the transistors $T_R$ and the transistor $T_{12}$ into an integrated switching circuit.

Although a particular preferred embodiment of the invention has been disclosed in detail for illustrative purposes, it will be recognized that variations or modifications of the disclosed apparatus, including the rearrangement of parts, lie within the scope of the present invention.

We claim:

1. An electronic circuit arrangement in which the ratio of the upper frequency limit to power input is improved, more especially for integrated circuits, comprising at least one bistable multivibrator having two stages and a common triggering input and a signal output, each said stage including a switching transistor and a control transistor of the same type, the collector-emitter sections of said switching transistor and control transistor of each stage being connected in parallel to each other, a capacitive link connecting the base of the control transistor of each stage to said common triggering input of the multivibrator, the base of the switching transistor of each stage being coupled directly to the collectors of the switching and control transistors of the other stage, the collectors of the switching and control transistors of one stage being connected to said signal output of the multivibrator, an input transistor in each stage of the multivibrator, supply means supplying said input transistors with an at least substantially constant base current, the collector-emitter section of each input transistor being connected between the base and collector of the control transistor of the relevant stage for rapid charging of said capacitive links, said input transistor being of the same type as the control transistor in the same stage.

2. A circuit arrangement as claimed in claim 1, wherein in each stage of the multivibrator the collector of the input transistor is connected to the collector of the control transistor of the relevant stage, and the emitter of the input transistor is connected to the base of the control transistor of that stage.

3. A circuit arrangement as claimed in claim 1, wherein said capacitive links comprise diodes.

4. A circuit arrangement as claimed in claim 1, wherein said supply means include a constant current source which includes a further transistor as an element which keeps the current constant, said further transistor being of a type which is complementary to the type of the input transistor, means supplying the base-emitter section of the further transistor with a reference voltage which keeps the current in the collector-emitter circuit of said further transistor at least approximately constant, the collector of said further transistor being connected to the base of the input transistor.

5. A circuit arrangement as claimed in claim 1, in which said supply means includes a current supply source and an ohmic resistance, wherein in each stage of the multivibrator the base of the input transistor is connected via said ohmic resistance to said current supply source.

6. A circuit arrangement as claimed in claim 1, including a constant current source having a further transistor as an element which keeps the current constant, said further transistor being of a type complementary to the type of the switching and control transistors, means defining a reference voltage source connected to the base-emitter section of said further transistor for keeping the current in the collector-emitter circuit of said further transistor at least approximately constant, the interconnected collectors of the switching and control transistors being connected to the collector of said further transistor for receiving constant current therefrom.

7. A circuit arrangement as claimed in claim 1, including a current supply source and an ohmic resistance connecting same to the collectors of the switching transistor and of the control transistor of each stage.

8. A circuit arrangement as claimed in claim 6, wherein said supply means includes a second constant current source which delivers the base currents of the input transistors at a lower current level than the first mentioned constant current source to which the collectors of the switching transistors and of the control transistors are connected.

9. A circuit arrangement as claimed in claim 8, wherein said second constant current source has a still further transistor as an element which keeps the current constant and including means connecting the base-emitter sections of said further and still further transistors in parallel to each other.

10. A circuit arrangement as claimed in claim 9, wherein the base-emitter sections of said further transistors are connected directly to said reference voltage source, including a common emitter resistance connecting the base-emitter sections of said still further transistors to the same reference voltage source, said reference voltage source including a resistance dependent upon temperature and charged with an at least approximately constant reference current, said dependent resistance comprising an additional transistor of the same type as that of said further and still further transistors, the emitter electrode of said additional transistor forming one pole and the collector and base electrodes of said additional transistor being connected together to form the other pole of said resistance dependent upon temperature.

11. A circuit arrangement as claimed in claim 9, wherein the base-emitter sections of said further transistors are connected to said reference voltage source, and the base emitter sections of said still further transistors being connected to a further separate reference voltage source, said reference voltage sources including a resistance dependent upon temperature which is charged in each case with an at least approximately constant reference current, said dependent resistance comprising an additional transistor of the same type as that of said further and still further transistors, the emitter electrode of said additional transistor forming one pole, and its collector and base electrodes, connected together, forming the other pole of said resistance dependent upon temperature.

12. A circuit arrangement as claimed in claim 8, wherein said second constant current source has a still further transistor as an element which keeps the current constant, the base-emitter section of said still further transistor and the base-emitter section of said further transistor belonging to the same stage are connected in series, to form a series line for each stage, a common reference voltage source, the series lines of the various stages of the multivibrator being connected to said common reference voltage source, a resistance dependent upon temperature and charged with an at least approximately constant reference current, said resistance being formed from two transistors of the same type as that of said further and still further transistors, the base-emitter sections of said two transistors being connected in series to form a second series line, the emitter electrode situated at the one end of said second series line forming one pole of said resistance dependent on temperature, the base electrode situated at the other end of said second series line together with the collector electrodes of said two transistors forming the other pole of said resistance dependent upon temperature.

13. A circuit arrangement as claimed in claim 1, wherein a large number of bistable multivibrators are connected together into a chain, whereby at least one part of the bistable multivibrators which form the chain is provided with preliminary transistors in their individual stages, and these bistable multivibrators, provided with preliminary transistors, are arranged in uninterrupted sequence from the input of the chain to a definite stage of the chain.

14. A circuit arrangement as claimed in claim 13 wherein the chain is a counter chain.

15. A circuit arrangement as claimed in claim 13 wherein the chain is an impulse frequency reducer.

* * * * *